(12) United States Patent
Gens et al.

(10) Patent No.: US 12,081,980 B2
(45) Date of Patent: Sep. 3, 2024

(54) APPARATUS AND METHOD FOR WI-FI NETWORK PROFILE VERIFICATION

(71) Applicant: Intel Corporation, Santa Clara, CA (US)

(72) Inventors: Stanislav Gens, Nazareth Illit (IL); Roi Fridburg, Haifa (IL); Preston Hunt, Portland, OR (US); Ido Ouzieli, Tel aviv (IL); Emily Qi, Gig Harbor, WA (US); Ehud Reshef, Qiryat Tivon (IL); Izoslav Tchigevsky, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 742 days.

(21) Appl. No.: 17/133,588

(22) Filed: Dec. 23, 2020

(65) Prior Publication Data

US 2021/0120410 A1 Apr. 22, 2021

(51) Int. Cl.
| | | |
|---|---|---|
| *H04W 12/06* | (2021.01) | |
| *H04L 5/00* | (2006.01) | |
| *H04W 12/037* | (2021.01) | |
| *H04W 76/10* | (2018.01) | |
| *H04W 76/30* | (2018.01) | |
| *H04W 84/12* | (2009.01) | |
| *H04W 88/08* | (2009.01) | |

(52) U.S. Cl.
CPC ......... *H04W 12/068* (2021.01); *H04L 5/0048* (2013.01); *H04W 12/037* (2021.01); *H04W 76/10* (2018.02); *H04W 76/30* (2018.02); *H04W 84/12* (2013.01); *H04W 88/08* (2013.01)

(58) Field of Classification Search
CPC ............... H04W 12/068; H04W 76/30; H04W 76/10; H04W 12/037; H04L 5/0048
USPC .......................................................... 726/6
See application file for complete search history.

(56) References Cited

U.S. PATENT DOCUMENTS

| | | | |
|---|---|---|---|
| 2016/0259936 A1* | 9/2016 | Mukherjee | ............ H04L 63/061 |
| 2017/0171200 A1* | 6/2017 | Bao | ........................ H04L 9/3213 |
| 2018/0337785 A1* | 11/2018 | Sanciangco | ......... H04W 12/069 |
| 2019/0373469 A1* | 12/2019 | Bradley | ............ H04W 12/0433 |

* cited by examiner

*Primary Examiner* — Kambiz Zand
*Assistant Examiner* — Phuc Pham
(74) *Attorney, Agent, or Firm* — East IP P.C.

(57) ABSTRACT

Provided herein are apparatus and methods for Wi-Fi network profile verification. An apparatus for a wireless communication device includes: a memory; and processor circuitry coupled with the memory, wherein the processor circuitry is to: encode a verification sequence in a probe request for transmission to an AP; decode, in response to the probe request, a probe response received from the AP to obtain a first verification result; determine a second verification result based on the verification sequence and a verification password (VP) obtained from the AP; and determine whether a verification for the AP is successful or not based on the first verification result and the second verification result, and wherein the memory is to store the VP. Other embodiments may also be disclosed and claimed.

18 Claims, 10 Drawing Sheets

400

--- decode a probe request received from a second wireless communication device to obtain a verification sequence — 410 encode, in response to the probe request, a probe response for transmission to the second wireless communication device, the probe response including a verification result which is based on the verification sequence and a VP — 420

APPARATUS AND METHOD FOR WI-FI NETWORK PROFILE VERIFICATION

TECHNICAL FIELD

Embodiments of the present disclosure generally relate to wireless communications, and in particular to apparatus and methods for Wi-Fi network profile verification.

BACKGROUND ART

More and more wireless devices are deployed and more and more studies focus on Wi-Fi network. Security and privacy is very important in Wi-Fi network. The present disclosure provides a mechanism to enhance security and privacy of Wi-Fi network.

BRIEF DESCRIPTION OF THE DRAWINGS

Embodiments of the disclosure will be illustrated, by way of example and not limitation, in the figures of the accompanying drawings in which like reference numerals refer to similar elements.

FIG. 4 illustrates a flowchart of a method for Wi-Fi network profile verification in accordance with one or more example embodiments of the present disclosure.

DETAILED DESCRIPTION OF EMBODIMENTS

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

Figure 1:
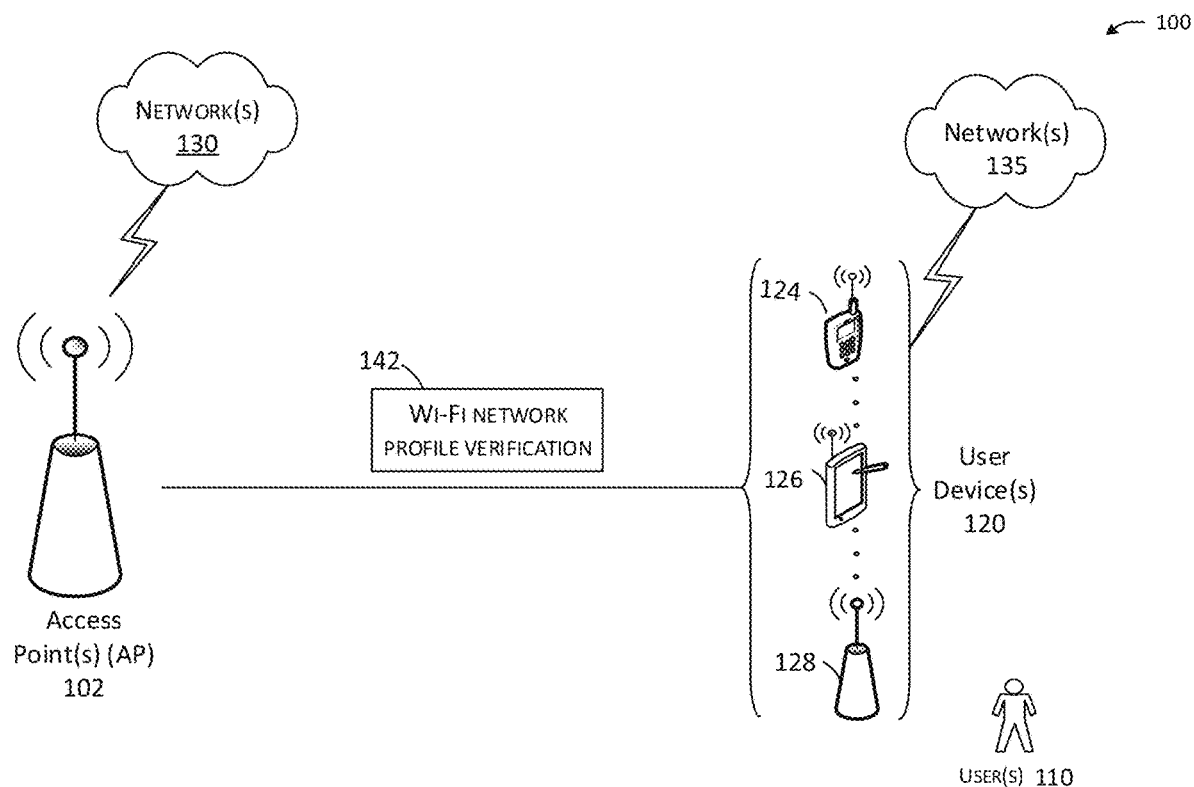
FIG. 1 illustrates a network diagram illustrating an example network environment in accordance with one or more example embodiments of the present disclosure.

FIG. 1 illustrates a network diagram illustrating an example network environment in accordance with one or more example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 5:
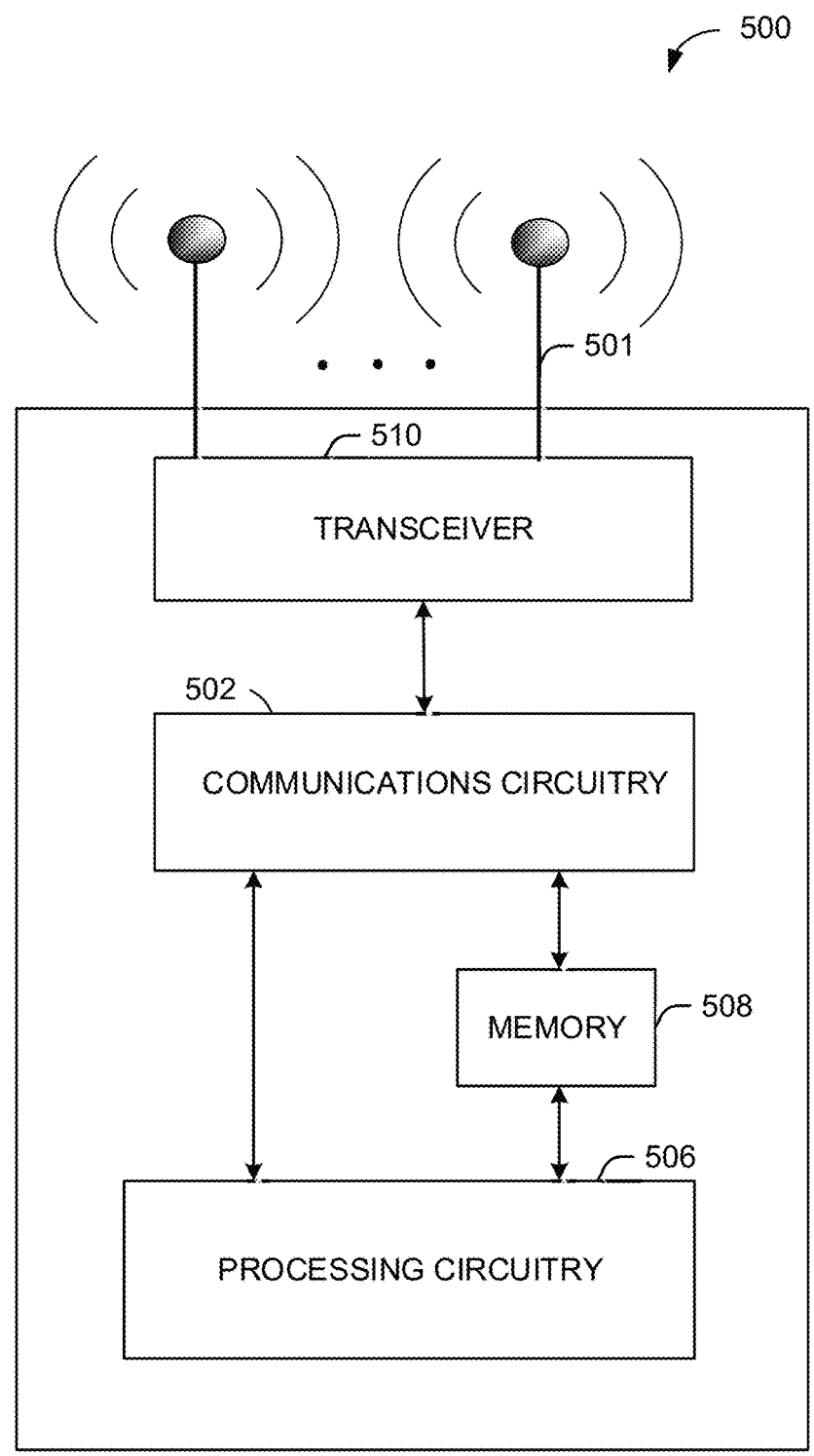
FIG. 5 illustrates a functional diagram of an exemplary communication station in accordance with one or more example embodiments of the present disclosure.
Figure 6:
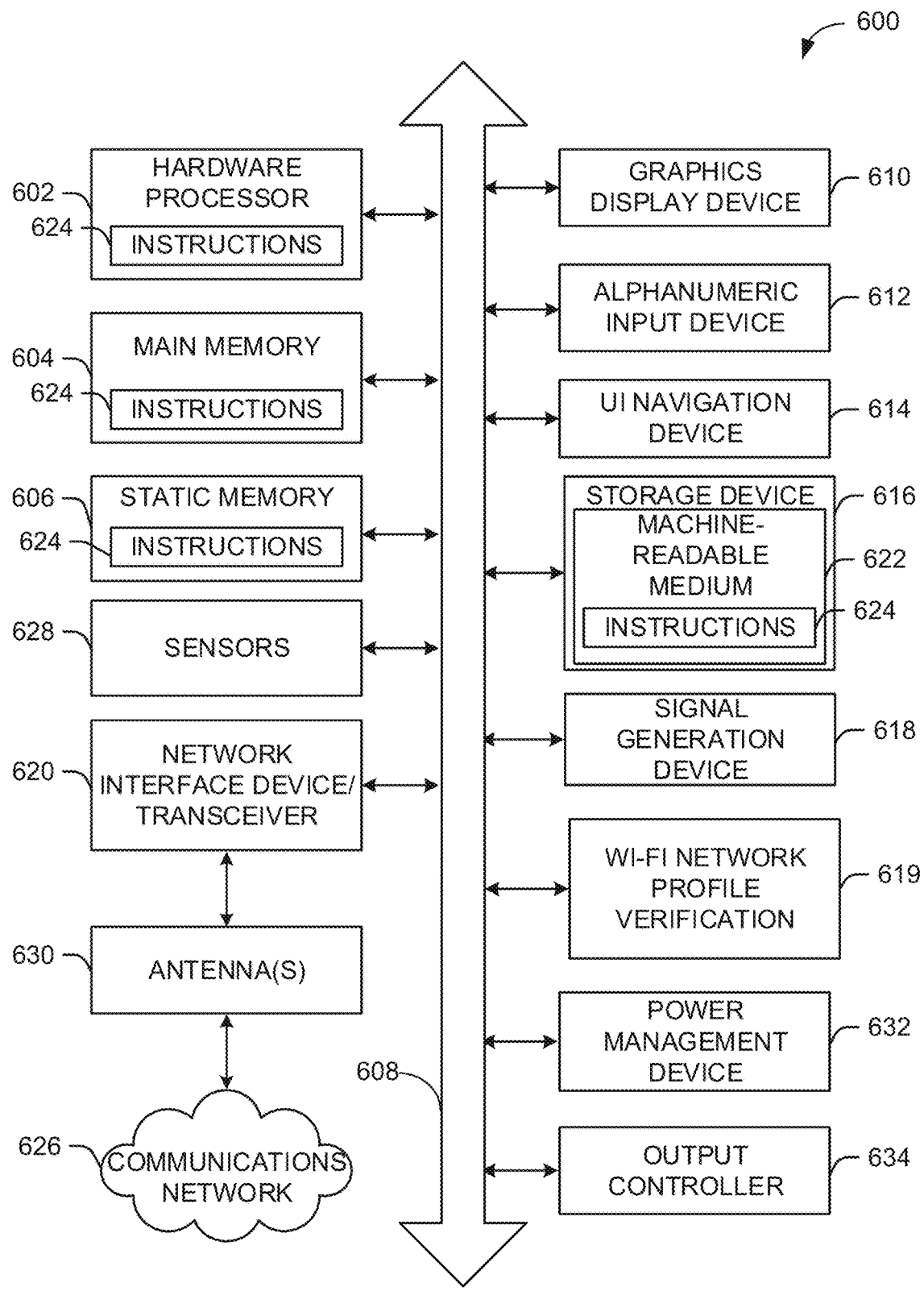
FIG. 6 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 5 and/or the example machine/system of FIG. 6.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (RD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). 800 MHz channels (e.g. 802.11ah). The communications antennas may operate at 28

GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, AP 102 may facilitate Wi-Fi network profile verification with one or more user devices 120 (or STA).

It is understood that the above descriptions are for purposes of illustration and are not meant to be limiting.

A device that connects to a Wi-Fi AP may act as a station (STA). Typically, after a connection between the AP and the STA is established, the STA may mark the network of the AP as "known" and store its networks profile. This profile may include basic network data, such as Service Set Identifier (SSID), authentication and encryption types, cyphers, etc. In case the STA has no active Wi-Fi connection and it recognizes a beacon/probe frame data as a familiar network, it will automatically trigger a connection process, which may start with an authentication frame.

It is very easy to duplicate a network profile, thus the network profile isn't secured information, and all an attacker needs is a public part of the network profile, which is broadcasted by the AP in the beacon frame. Once the attacker has the public part of the network profile, the attacker can set its own AP with the same data in the public part. From now on, all the attacker needs to do is to sniff the air—once he recognizes an authentication frame with the same data of the public part, it means there is a certain device in the Wi-Fi range that already has this profile stored.

Such a privacy leak allows the attacker to be aware of approximate location of a Wi-Fi device (e.g., mobile, laptop and the like). In an example, a home network is usually used by a limited number of members, it may be easy to track a location of a specific person. In another example, enterprise/public networks may also be useful for attack. Sometimes a person's belonging to some organization can be private information that he wants to keep in secret. For instance, once the attacker has a database (DB) of a Wi-Fi profile of a police station in his area, he has a good chance to know if there is a policeman near him. In yet another example, a corporate spy who wants to steal laptops from a competitor's company may be able to detect the presence of laptops or devices in luggage or trunks of cars.

A Wi-Fi station may implement auto-connection, which allows the Wi-Fi station to be connected to a known network without any active input from the Wi-Fi station. Although auto-connection is very important for user experience, it also may reveal user's identity and compromise his privacy.

In an example attack using auto-connection, a STA UUU may be connected to a network UUU_net, e.g. with a passphrase or a certificate, and the STA UUU may store a profile of the network UUU_net for future auto-connection. An attacker EEE wants to know if any UUU_net related user/device is in some location. The attacker EEE has the profile of the network UUU_net by easily "sniffing" the air. Then the attacker EEE may set an AP (or just a device that may send beacons and/or probe responses) with UUU_net profile in a required location range. In case that the STA UUU is within the required location range, when the STA UUU scans the air for Wi-Fi, the STA UUU may hear the beacon/probe with known profile from the attacker EEE, then the STA UUU may send an authentication request frame to the attacker EEE. At this point, the attacker EEE can declare success, as once the STA UUU send an authentication frame, he reveals himself.

The present disclosure will provide apparatus and methods for Wi-Fi network profile verification to make a basic network profile verification before auto-connection starts, at the very scan stage.

Figure 2:
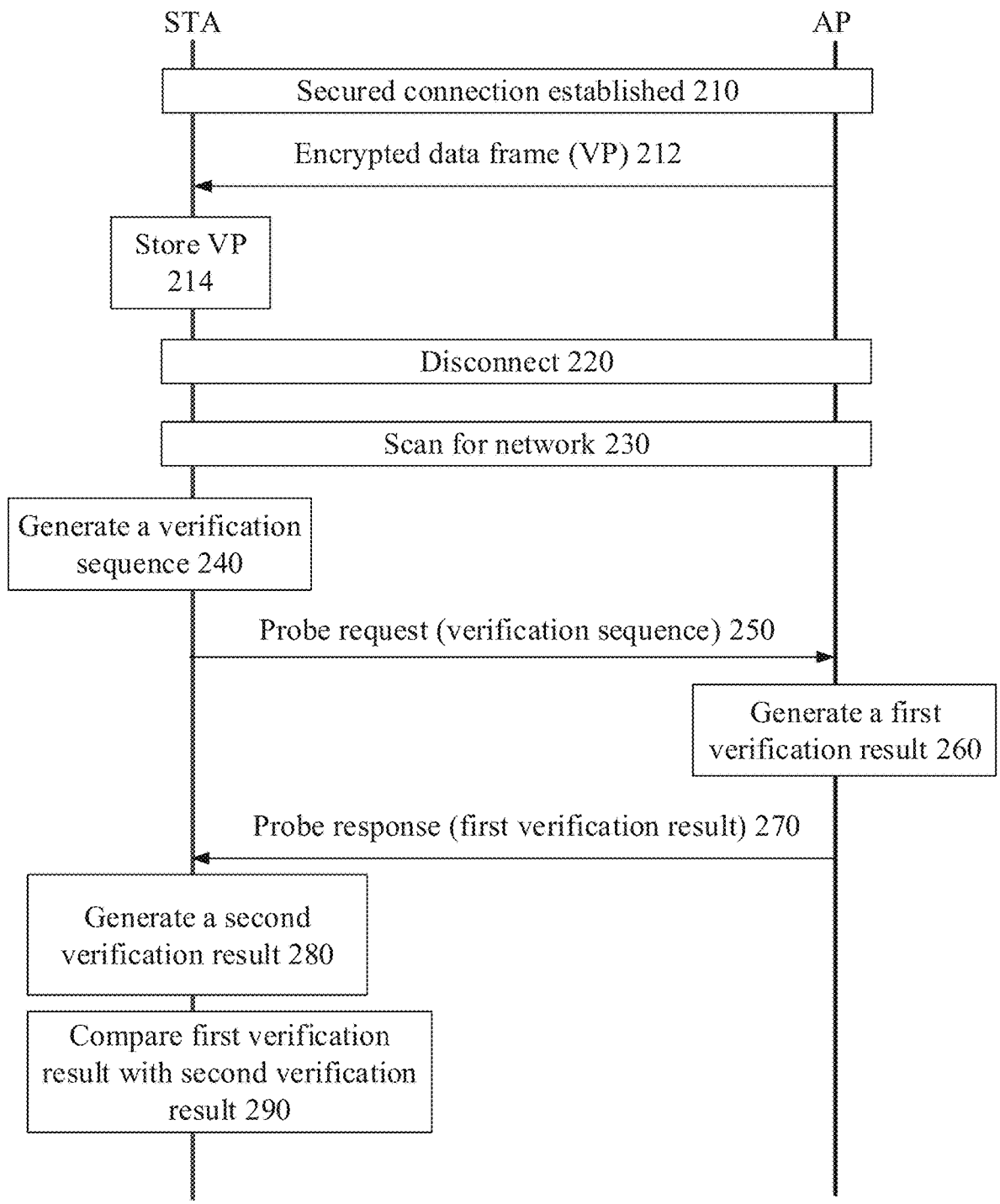
FIG. 2 illustrates a communication diagram for Wi-Fi network profile verification in accordance with one or more example embodiments of the present disclosure.

FIG. 2 illustrates a communication diagram 200 for Wi-Fi network profile verification in accordance with one or more example embodiments of the present disclosure.

The communication diagram 200 may include two sub-parts. The first sub-part may include operations 210, 212, 214 and 220, which are related to a secured connection between the STA and the AP for the first time. The second sub-part may include the remaining operations 230-290, which are related to a reconnection between the STA and the AP.

As shown, at 210, a secured connection between the STA and the AP may be established for the first time (not automatic connection). After the establishment of the secured connection, at 212, the AP may send an encrypted data frame to the STA. The encrypted data frame includes a verification password (VP) which is held by the AP. In some embodiments, each AP may have its corresponding VP. At 214, the STA may obtain and store the VP. For example, the STA may store the VP as a part of a network profile of the AP, along with other parameters such as SSID, type, ciphers, password, etc. At this point, both of the STA and the AP hold the VP through a secured connection. It is noted that generation and distribution of the VP to the AP is not limited in the present disclosure.

At 220, the secured connection is disconnected. At this point, the STA is disconnected from the AP, but both of them hold the VP for further connection.

During the second sub-part, the STA try to reconnect with the AP by scanning at 230. Upon a scan decision, the STA may generate a verification sequence at 240. In some embodiments, the verification sequence may be generated randomly. At 250, the STA may broadcast a probe request including the verification sequence, e.g., with the verification sequence inside one of its information elements. Once the AP obtains the verification sequence within the probe request, the AP may generate a first verification result based on the verification sequence and the VP at 260, and send a probe response including the first verification result to the STA at 270, e.g., with the first verification result inside one of its information elements. In some embodiments, the AP may conduct Hash algorithm over the received verification sequence with the VP to obtain the first verification result. In other embodiments, the AP may employ any other algorithm to obtain the first verification result. The disclosure is not limited in this respect.

As shown, at 280, the STA may generate a second verification result based on its own generated verification sequence at 240 and the VP stored at 214. In some embodiments, the STA may conduct Hash algorithm over the generated verification sequence with the VP to obtain the second verification result. In other embodiments, the STA may employ any other algorithm to obtain the first verification result. The disclosure is not limited in this respect. However, the algorithm employed by the AP and the STA in generation of corresponding verification result may be the same or similar for further comparison. Operation 280 shown in FIG. 2 is performed after operation 270. However, this is only an example, and operation 280 can be performed any time after generation of the verification sequence at 240. The disclosure is not limited in this respect.

At this point, the STA may know both of the first verification result generated by the AP and the second verification result generated by the STA. At 290, the STA may compare the first verification result with the second verification result to determine whether they match with each other. Based on the comparison, the STA may determine whether the AP is a secured one. If the AP is secured, the STA may continue with an authentication process.

In order to guarantee security and privacy of the connection, the length of the verification sequence and the VP may be considered. Short VP might be vulnerable in cryptograph and may be found with brute force attack. Short verification sequence may allow the attacker to create a map of verification sequence pairs {verification sequence generated by the STA, encrypted verification sequence by the AP}. In some embodiments, the verification sequence may have a length of 128 bits or more. In some embodiments, the VP may have a length of 128 bits or more. In other embodiments, the verification sequence and/or the VP may have any other length, which is not limited in the disclosure. The length of the verification sequence and the length of the VP may be the same or different, which is not limited in the disclosure.

Figure 3:
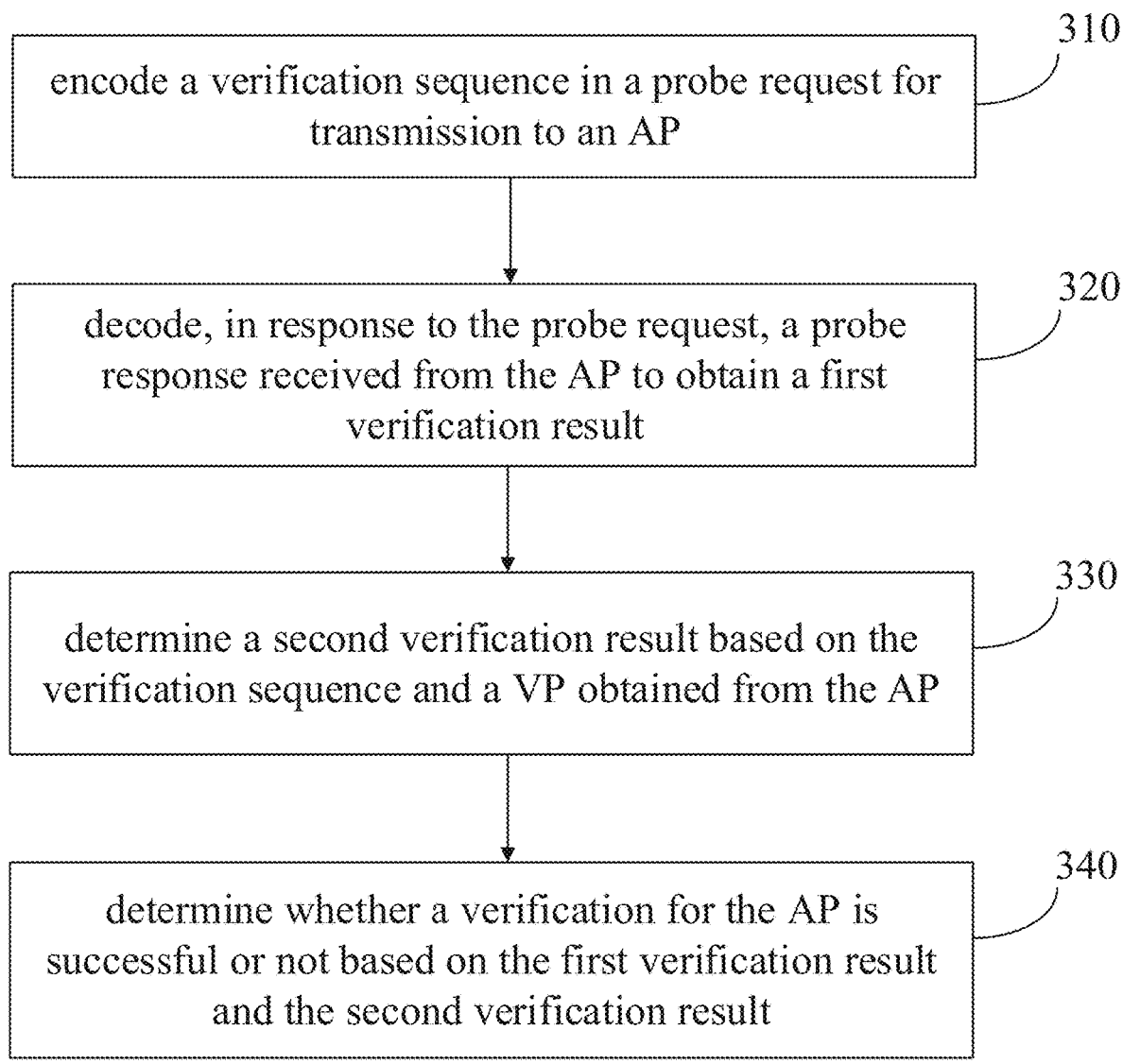
FIG. 3 illustrates a flowchart of a method for Wi-Fi network profile verification in accordance with one or more example embodiments of the present disclosure.

FIG. 3 illustrates a flowchart of a method 300 for Wi-Fi network profile verification in accordance with one or more example embodiments of the present disclosure. The method 300 may include steps 310, 320, 330 and 340, which may be performed by a STA.

At 310, a verification sequence may be encoded in a probe request for transmission to an AP. At 320, in response to the probe request, a probe response received from the AP may be decoded to obtain a first verification result. At 330, a second verification result is determined based on the verification sequence and a VP obtained from the AP. At 340, it is determined whether a verification for the AP is successful or not based on the first verification result and the second verification result.

In some embodiments, the second verification result is determined by performing an algorithm over the verification sequence with the VP. In some embodiments, the algorithm may include a Hash algorithm.

In some embodiments, the first verification result is compared with the second verification result; and it is determined that the verification for the AP is successful if the first verification result matches with the second verification result.

In some embodiments, an encrypted data frame received from the AP is decoded to obtain the VP.

In some embodiments, the verification sequence is randomly generated.

In some embodiments, before encoding the verification sequence in the probe request, a secured connection is established with the AP for a first time, and the secured connection with the AP is disconnected.

FIG. 4 illustrates a flowchart of a method 400 for Wi-Fi network profile verification in accordance with one or more example embodiments of the present disclosure. The method 400 may include steps 410 and 420, which may be performed by an AP.

At 410, a probe request received from a second wireless communication device may be decoded to obtain a verification sequence. At 420, in response to the probe request, a probe response may be encoded for transmission to the second wireless communication device. The probe response includes a verification result which is based on the verification sequence and a VP.

In some embodiments, the verification result is determined by performing an algorithm over the verification sequence with the VP. In some embodiments, the algorithm may include a Hash algorithm.

In some embodiments, prior to reception of the probe request, the VP is encoded in an encrypted data frame for transmission to the second wireless communication device.

In some embodiments, prior to reception of the probe request, a secured connection is established with the second wireless communication device for a first time and the secured connection is disconnected with the second wireless communication device.

Methods 300 and 400 can be understood from perspective of the STA and the AP respectively in conjunction with the communication diagram 200 in FIG. 2. Some embodiments are omitted here to avoid unnecessary repetition.

With the mechanism of Wi-Fi network profile verification described in the disclosure, privacy leak may be avoided by transmission of VP during the first secured connection and verification of verification sequence with the VP during subsequent scan for networks. In this way, security and privacy can be enhance in Wi-Fi network.

The embodiments are described in the aspect of Wi-Fi network. However, the mechanism proposed in the disclosure is not limited in the Wi-Fi network, and it may be applicable in any other network. The disclosure is not limited in this respect.

FIG. 5 illustrates a functional block diagram of a communication station 500 that may be suitable for use as a Wi-Fi device in accordance with some embodiments. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or medium access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in the above figures, diagrams, and flows.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (e.g., drive unit) 616, a signal generation device 618 (e.g., a speaker), a Wi-Fi network profile verification device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 602 for generation and processing of the baseband signals and for controlling operations of the main memory 604, the storage device 616, and/or the Wi-Fi network profile verification device 619. The baseband processor may be provided on a single radio card, a single chip, or an integrated circuit (IC).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The Wi-Fi network profile verification device 619 may carry out or perform any of the operations and processes (e.g., processes 200, 300 and 400) described and shown above.

It is understood that the above are only a subset of what the Wi-Fi network profile verification device 619 may be configured to perform and that other functions included throughout this disclosure may also be performed by the Wi-Fi network profile verification device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 7:
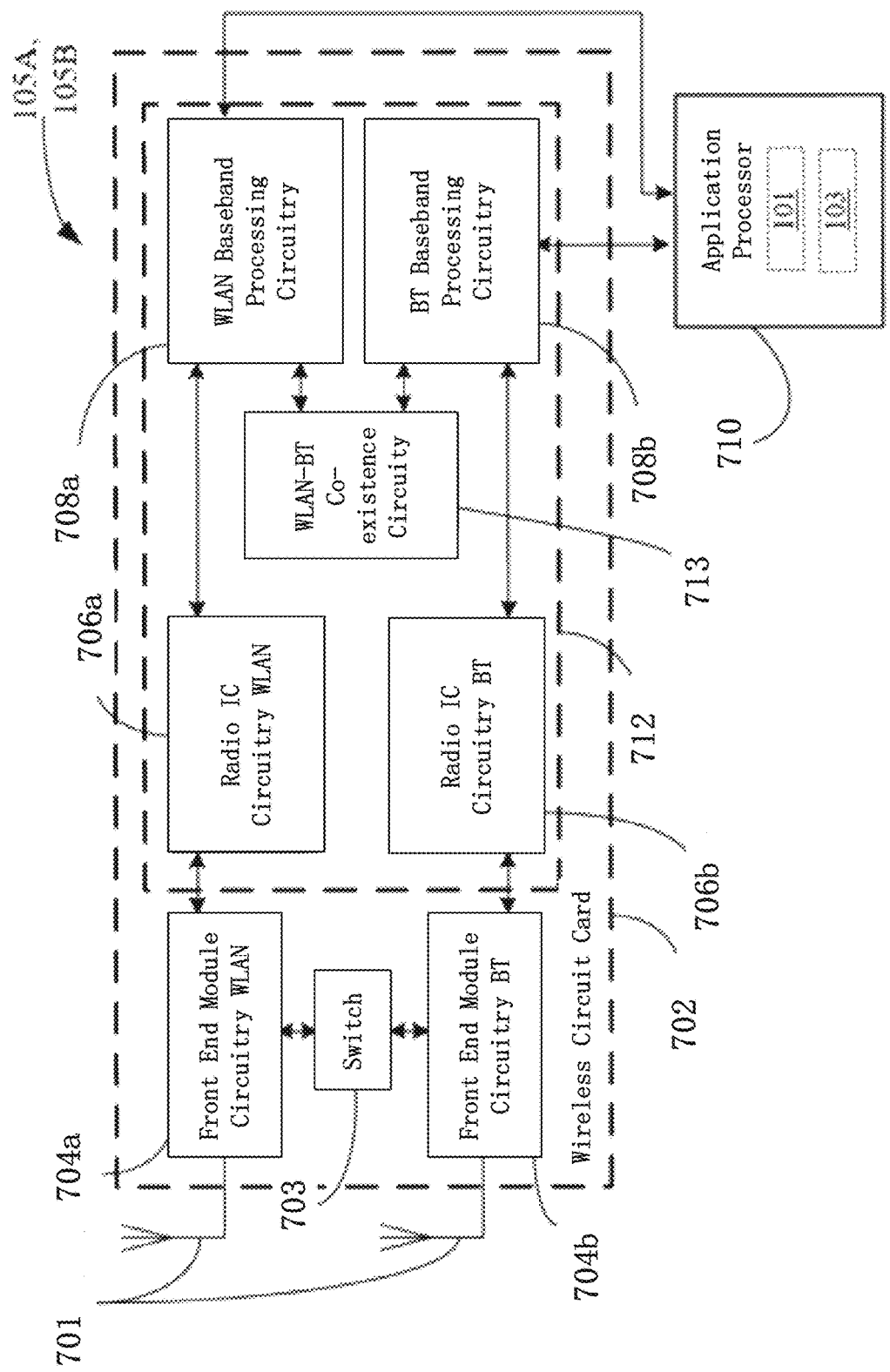
FIG. 7 is a block diagram of a radio architecture in accordance with some examples.

FIG. 7 is a block diagram of a radio architecture 105A, 105B in accordance with some embodiments that may be implemented in any Wi-Fi device described above. Radio architecture 105A, 105B may include radio front-end module (FEM) circuitry 704a-b, radio IC circuitry 706a-b and baseband processing circuitry 708a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 704a-b may include a WLAN or Wi-Fi FEM circuitry 704a and a Bluetooth (BT) FEM circuitry 704b. The WLAN FEM circuitry 704a may include a receive signal path comprising circuitry configured to operate on WLAN RF signals received from one or more antennas 701, to amplify the received signals and to provide the amplified versions of the received signals to the WLAN radio IC circuitry 706a for further processing. The BT FEM circuitry 704b may include a receive signal path which may include circuitry configured to operate on BT RF signals received from one or more antennas 701, to amplify the received signals and to provide the amplified versions of the received signals to the BT radio IC circuitry 706b for further processing. FEM circuitry 704a may also include a transmit signal path which may include circuitry configured to amplify WLAN signals provided by the radio IC circuitry 706a for wireless transmission by one or more of the antennas 701. In addition, FEM circuitry 704b may also include a transmit signal path which may include circuitry configured to amplify BT signals provided by the radio IC circuitry 706b for wireless transmission by the one or more antennas. In the embodiment of FIG. 7, although FEM 704a and FEM 704b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 706a-b as shown may include WLAN radio IC circuitry 706a and BT radio IC circuitry 706b. The WLAN radio IC circuitry 706a may include a receive signal path which may include circuitry to down-convert WLAN RF signals received from the FEM circuitry 704a and provide baseband signals to WLAN baseband processing circuitry 708a. BT radio IC circuitry 706b may in turn include a receive signal path which may include circuitry to down-convert BT RF signals received from the FEM circuitry 704b and provide baseband signals to BT baseband processing circuitry 708b. WLAN radio IC circuitry 706a may also include a transmit signal path which may include circuitry to up-convert WLAN baseband signals provided by the WLAN baseband processing circuitry 708a and provide WLAN RF output signals to the FEM circuitry 704a for subsequent wireless transmission by the one or more antennas 701. BT radio IC circuitry 706b may also include a transmit signal path which may include circuitry to up-convert BT baseband signals provided by the BT baseband processing circuitry 708b and provide BT RF output signals to the FEM circuitry 704b for subsequent wireless transmission by the one or more antennas 701. In the embodiment of FIG. 7, although radio IC circuitries 706a and 706b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 708a-b may include a WLAN baseband processing circuitry 708a and a BT baseband processing circuitry 708b. The WLAN baseband processing circuitry 708a may include a memory, such as, for example, a set of RAM arrays in a Fast Fourier Transform or Inverse Fast Fourier Transform block (not shown) of the WLAN baseband processing circuitry 708a. Each of the WLAN baseband circuitry 708a and the BT baseband circuitry 708b may further include one or more processors and control logic to process the signals received from the corresponding WLAN or BT receive signal path of the radio IC circuitry 706a-b, and to also generate corresponding WLAN or BT baseband signals for the transmit signal path of the radio IC circuitry 706a-b. Each of the baseband processing circuitries 708a and 708b may further include physical layer (PHY) and medium access control layer (MAC) circuitry, and may further interface with a device for generation and processing of the baseband signals and for controlling operations of the radio IC circuitry 706a-b.

Referring still to FIG. 7, according to the shown embodiment, WLAN-BT coexistence circuitry 713 may include logic providing an interface between the WLAN baseband circuitry 708a and the BT baseband circuitry 708b to enable use cases requiring WLAN and BT coexistence. In addition, a switch 703 may be provided between the WLAN FEM circuitry 704a and the BT FEM circuitry 704b to allow switching between the WLAN and BT radios according to application needs. In addition, although the antennas 701 are depicted as being respectively connected to the WLAN FEM circuitry 704a and the BT FEM circuitry 704b, embodiments include within their scope the sharing of one or more antennas as between the WLAN and BT FEMs, or the provision of more than one antenna connected to each of FEM 704a or 704b.

In some embodiments, the front-end module circuitry 704a-b, the radio IC circuitry 706a-b, and baseband processing circuitry 708a-b may be provided on a single radio card, such as wireless radio card 702. In some other embodiments, the one or more antennas 701, the FEM circuitry 704a-b and the radio IC circuitry 706a-b may be provided on a single radio card. In some other embodiments, the radio IC circuitry 706a-b and the baseband processing circuitry 708a-b may be provided on a single chip or integrated circuit (IC), such as IC 712.

In some embodiments, the wireless radio card 702 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11 ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 7, the BT baseband circuitry 708b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 8:
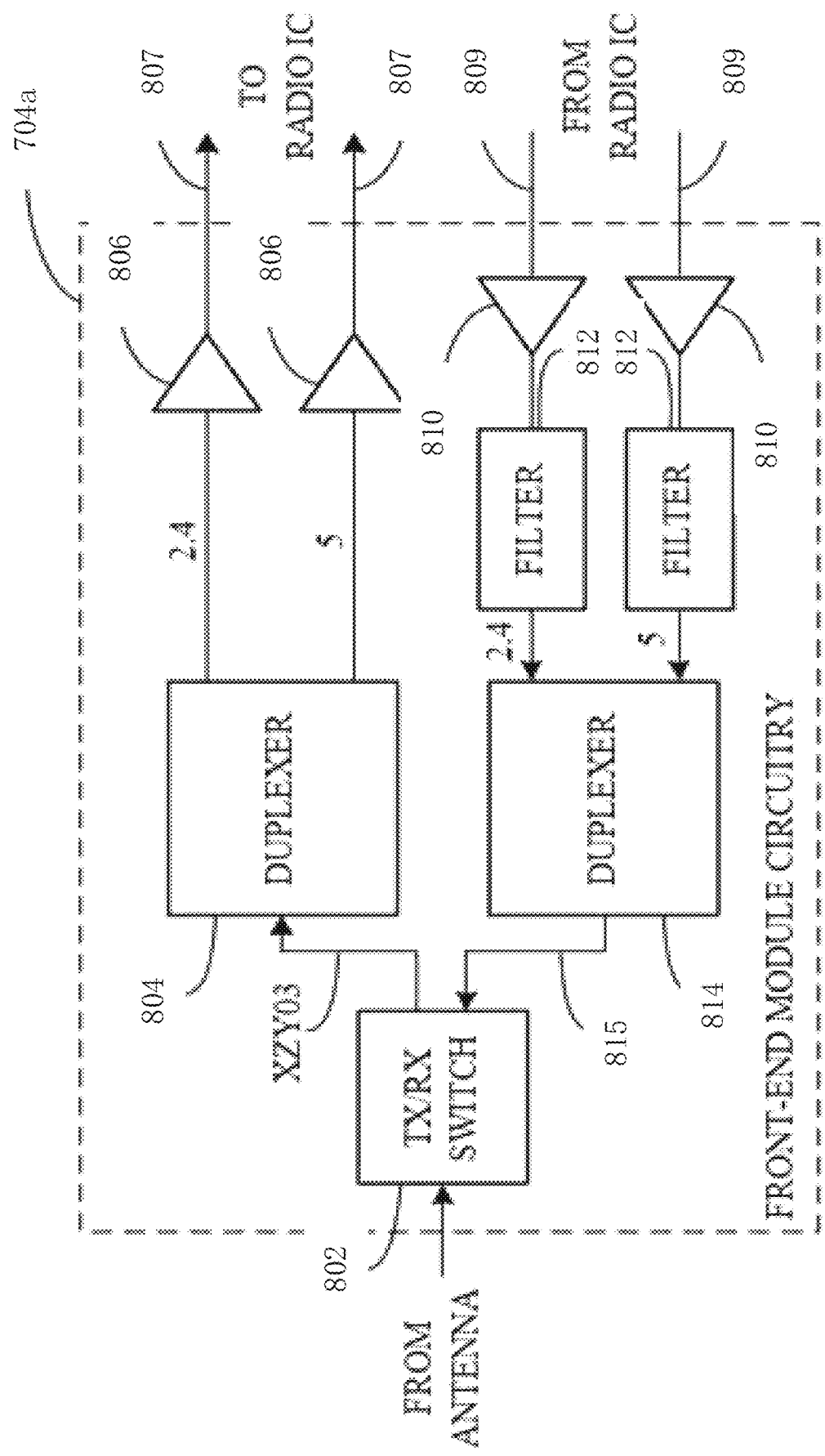
FIG. 8 illustrates an example front-end module circuitry for use in the radio architecture of FIG. 7, in accordance with one or more example embodiments of the present disclosure.

FIG. 8 illustrates WLAN FEM circuitry 704a in accordance with some embodiments. Although the example of FIG. 8 is described in conjunction with the WLAN FEM circuitry 704a, the example of FIG. 8 may be described in conjunction with the example BT FEM circuitry 704b (FIG. 7), although other circuitry configurations may also be suitable.

In some embodiments, the FEM circuitry 704a may include a TX/RX switch 802 to switch between transmit mode and receive mode operation. The FEM circuitry 704a may include a receive signal path and a transmit signal path. The receive signal path of the FEM circuitry 704a may include a low-noise amplifier (LNA) 806 to amplify received RF signals 803 and provide the amplified received RF signals 807 as an output (e.g., to the radio IC circuitry 706a-b (FIG. 7)). The transmit signal path of the circuitry 704a may include a power amplifier (PA) to amplify input RF signals 809 (e.g., provided by the radio IC circuitry 706a-b), and one or more filters 812, such as band-pass filters (BPFs), low-pass filters (LPFs) or other types of filters, to generate RF signals 815 for subsequent transmission (e.g., by one or more of the antennas 701 (FIG. 7)) via an example duplexer 814.

In some dual-mode embodiments for Wi-Fi communication, the FEM circuitry 704a may be configured to operate in either the 2.4 GHz frequency spectrum or the 5 GHz frequency spectrum. In these embodiments, the receive signal path of the FEM circuitry 704a may include a receive signal path duplexer 804 to separate the signals from each spectrum as well as provide a separate LNA 806 for each spectrum as shown. In these embodiments, the transmit signal path of the FEM circuitry 704a may also include a power amplifier 810 and a filter 812, such as a BPF, an LPF or another type of filter for each frequency spectrum and a transmit signal path duplexer 804 to provide the signals of one of the different spectrums onto a single transmit path for subsequent transmission by the one or more of the antennas 701 (FIG. 7). In some embodiments, BT communications may utilize the 2.4 GHz signal paths and may utilize the same FEM circuitry 704a as the one used for WLAN communications.

Figure 9:
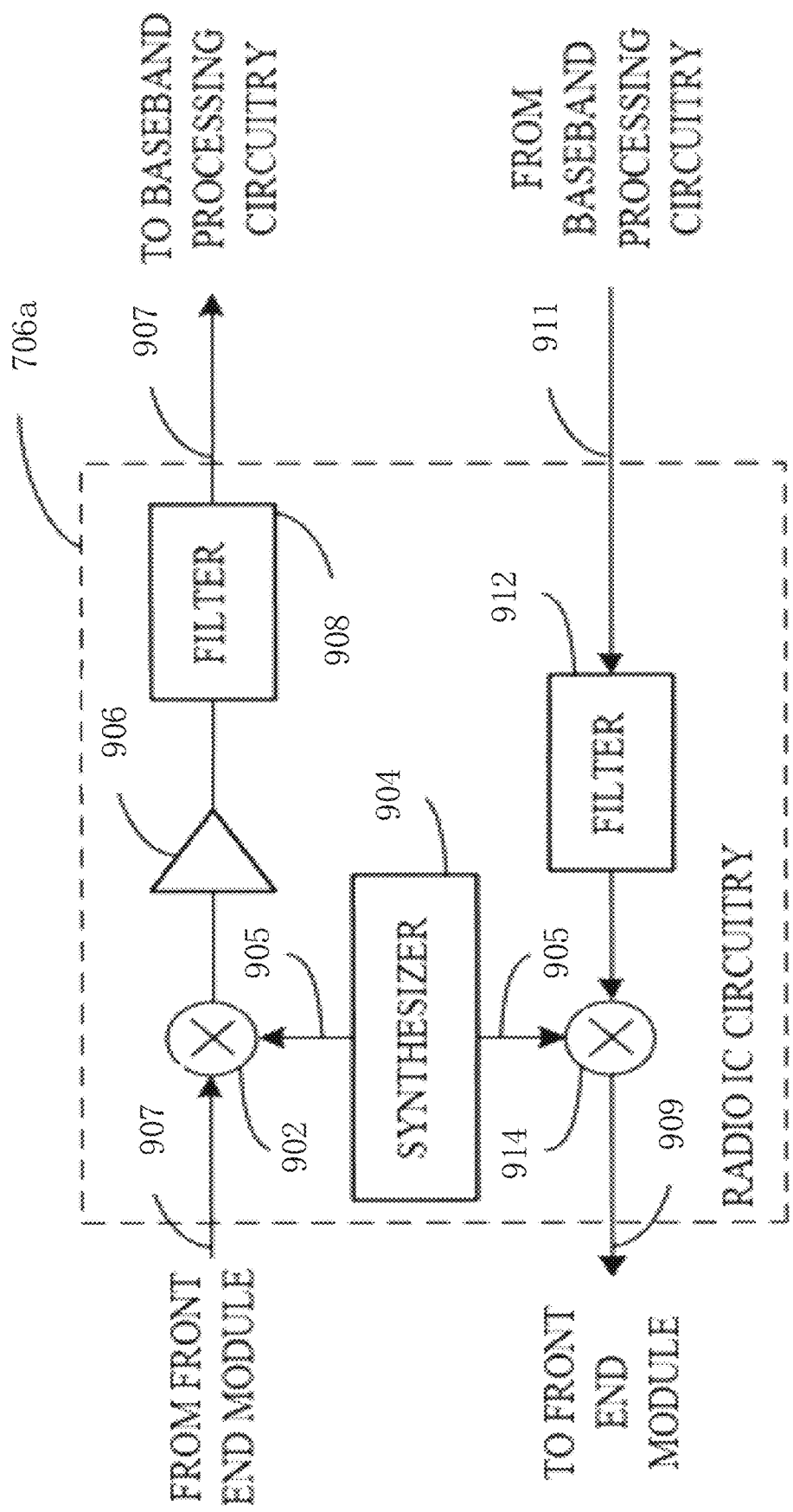
FIG. 9 illustrates an example radio IC circuitry for use in the radio architecture of FIG. 7, in accordance with one or more example embodiments of the present disclosure.

FIG. 9 illustrates radio IC circuitry 706a in accordance with some embodiments. The radio IC circuitry 706a is one example of circuitry that may be suitable for use as the WLAN or BT radio IC circuitry 706a/706b (FIG. 7), although other circuitry configurations may also be suitable. Alternatively, the example of FIG. 9 may be described in conjunction with the example BT radio IC circuitry 706b.

In some embodiments, the radio IC circuitry 706a may include a receive signal path and a transmit signal path. The receive signal path of the radio IC circuitry 706a may include at least mixer circuitry 902, such as, for example, down-conversion mixer circuitry, amplifier circuitry 906 and filter circuitry 908. The transmit signal path of the radio IC circuitry 706a may include at least filter circuitry 912 and mixer circuitry 914, such as, for example, up-conversion mixer circuitry. Radio IC circuitry 706a may also include synthesizer circuitry 904 for synthesizing a frequency 905 for use by the mixer circuitry 902 and the mixer circuitry 914. The mixer circuitry 902 and/or 914 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 9 illustrates only a simplified version of a radio IC circuitry, and may include, although not shown, embodiments where each of the depicted circuitries may include more than one component. For instance, mixer circuitry 914 may each include one or more mixers, and filter circuitries 908 and/or 912 may each include one or more filters, such as one or more BPFs and/or LPFs according to application needs. For example, when mixer circuitries are of the direct-conversion type, they may each include two or more mixers.

In some embodiments, mixer circuitry 902 may be configured to down-convert RF signals 807 received from the FEM circuitry 704a-b (FIG. 7) based on the synthesized frequency 905 provided by synthesizer circuitry 904. The amplifier circuitry 906 may be configured to amplify the down-converted signals and the filter circuitry 908 may include an LPF configured to remove unwanted signals from the down-converted signals to generate output baseband signals 907. Output baseband signals 907 may be provided to the baseband processing circuitry 708a-b (FIG. 7) for further processing. In some embodiments, the output baseband signals 907 may be zero-frequency baseband signals, although this is not a requirement. In some embodiments, mixer circuitry 902 may comprise passive mixers, although the scope of the embodiments is not limited in this respect.

In some embodiments, the mixer circuitry 914 may be configured to up-convert input baseband signals 911 based on the synthesized frequency 905 provided by the synthesizer circuitry 904 to generate RF output signals 809 for the FEM circuitry 704a-b. The baseband signals 911 may be provided by the baseband processing circuitry 708a-b and may be filtered by filter circuitry 912. The filter circuitry 912 may include an LPF or a BPF, although the scope of the embodiments is not limited in this respect.

In some embodiments, the mixer circuitry 902 and the mixer circuitry 914 may each include two or more mixers and may be arranged for quadrature down-conversion and/or up-conversion respectively with the help of synthesizer 904. In some embodiments, the mixer circuitry 902 and the mixer circuitry 914 may each include two or more mixers each configured for image rejection (e.g., Hartley image rejection). In some embodiments, the mixer circuitry 902 and the mixer circuitry 914 may be arranged for direct down-conversion and/or direct up-conversion, respectively. In some embodiments, the mixer circuitry 902 and the mixer circuitry 914 may be configured for super-heterodyne operation, although this is not a requirement.

Mixer circuitry 902 may comprise, according to one embodiment: quadrature passive mixers (e.g., for the in-phase (I) and quadrature phase (Q) paths). In such an embodiment, RF input signal 807 from FIG. 9 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 905 of synthesizer 904 (FIG. 9). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 807 (FIG. 8) may comprise a balanced signal, although the scope of the embodiments is not limited in this respect. The I and Q baseband output signals may be provided to low-noise amplifier, such as amplifier circuitry 906 (FIG. 9) or to filter circuitry 908 (FIG. 9).

In some embodiments, the output baseband signals 907 and the input baseband signals 911 may be analog baseband signals, although the scope of the embodiments is not limited in this respect. In some alternate embodiments, the output baseband signals 907 and the input baseband signals 911 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 904 may be a fractional-N synthesizer or a fractional N/N+1 synthesizer, although the scope of the embodiments is not limited in this respect as other types of frequency synthesizers may be suitable. For example, synthesizer circuitry 904 may be a delta-sigma synthesizer, a frequency multiplier, or a synthesizer comprising a phase-locked loop with a frequency divider. According to some embodiments, the synthesizer circuitry 904 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 904 may be provided by a voltage controlled oscillator (VCO), although that is not a requirement. A divider control input may further be provided by either the baseband processing circuitry 708a-b (FIG. 7) depending on the desired output frequency 905. In some embodiments, a divider control input (e.g., N) may be determined from a look-up table (e.g., within a Wi-Fi card) based on a channel number and a channel center frequency as determined or indicated by the example application processor 710. The application processor 710 may include, or otherwise be connected to, one of the example secure signal converter 101 or the example received signal converter 103 (e.g., depending on which device the example radio architecture is implemented in).

In some embodiments, synthesizer circuitry 904 may be configured to generate a carrier frequency as the output frequency 905, while in other embodiments, the output frequency 905 may be a fraction of the carrier frequency (e.g., one-half the carrier frequency, one-third the carrier frequency). In some embodiments, the output frequency 905 may be a LO frequency (fLO).

Figure 10:
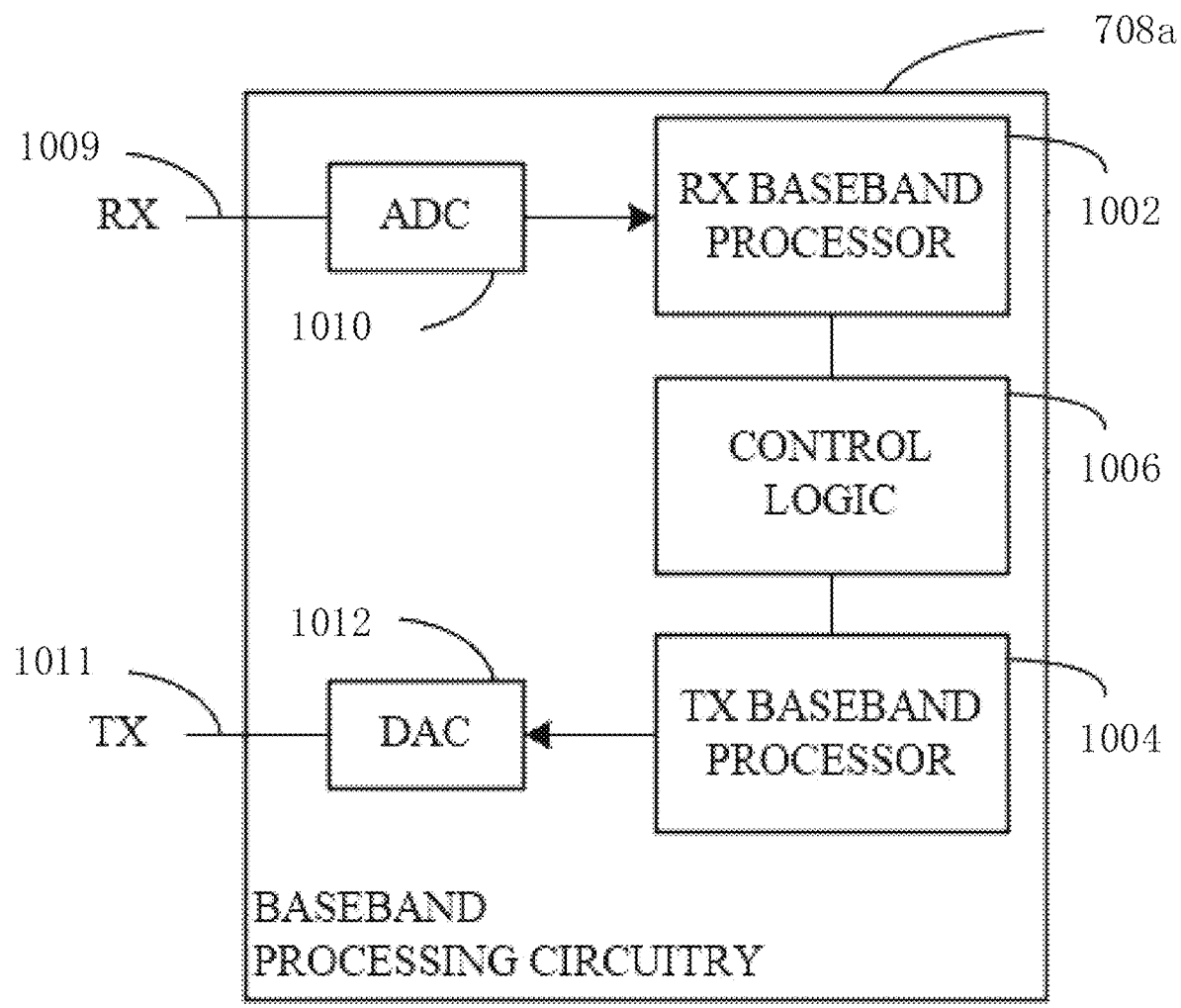
FIG. 10 illustrates an example baseband processing circuitry for use in the radio architecture of FIG. 7, in accordance with one or more example embodiments of the present disclosure.

FIG. 10 illustrates a functional block diagram of baseband processing circuitry 708a in accordance with some embodiments. The baseband processing circuitry 708a is one example of circuitry that may be suitable for use as the baseband processing circuitry 708a (FIG. 7), although other circuitry configurations may also be suitable. Alternatively, the example of FIG. 9 may be used to implement the example BT baseband processing circuitry 708b of FIG. 7.

The baseband processing circuitry 708a may include a receive baseband processor (RX BBP) 1002 for processing receive baseband signals 909 provided by the radio IC circuitry 706a-b (FIG. 7) and a transmit baseband processor (TX BBP) 1004 for generating transmit baseband signals 911 for the radio IC circuitry 706a-b. The baseband processing circuitry 708a may also include control logic 1006 for coordinating the operations of the baseband processing circuitry 708a.

In some embodiments (e.g., when analog baseband signals are exchanged between the baseband processing circuitry 708a-b and the radio IC circuitry 706a-b), the baseband processing circuitry 708a may include ADC 1010 to convert analog baseband signals 1009 received from the radio IC circuitry 706a-b to digital baseband signals for processing by the RX BBP 1002. In these embodiments, the baseband processing circuitry 708a may also include DAC 1012 to convert digital baseband signals from the TX BBP 1004 to analog baseband signals 1011.

In some embodiments that communicate OFDM signals or OFDMA signals, such as through baseband processor 708a, the transmit baseband processor 1004 may be configured to generate OFDM or OFDMA signals as appropriate for transmission by performing an inverse fast Fourier transform (IFFT). The receive baseband processor 1002 may be configured to process received OFDM signals or OFDMA signals by performing an FFT. In some embodiments, the receive baseband processor 1002 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 7, in some embodiments, the antennas 701 (FIG. 7) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 701 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The following paragraphs describe examples of various embodiments.

Example 1 includes an apparatus for a wireless communication device, the apparatus comprising: a memory; and processor circuitry coupled with the memory, wherein the processor circuitry is to: encode a verification sequence in a probe request for transmission to an access point (AP); decode, in response to the probe request, a probe response received from the AP to obtain a first verification result; determine a second verification result based on the verification sequence and a verification password (VP) obtained from the AP; and determine whether a verification for the AP is successful or not based on the first verification result and the second verification result, and wherein the memory is to store the VP.

Example 2 includes the apparatus of Example 1, wherein the processor circuitry is further to: determine the second verification result by performing an algorithm over the verification sequence with the VP.

Example 3 includes the apparatus of Example 2, wherein the algorithm includes a Hash algorithm.

Example 4 includes the apparatus of Example 1, wherein the processor circuitry is further to: compare the first verification result with the second verification result; and determine that the verification for the AP is successful if the first verification result matches with the second verification result.

Example 5 includes the apparatus of Example 1, wherein the processor circuitry is further to: decode an encrypted data frame received from the AP to obtain the VP.

Example 6 includes the apparatus of Example 1, wherein the processor circuitry is further to: randomly generate the verification sequence.

Example 7 includes the apparatus of Example 1, wherein before encoding the verification sequence in the probe request, the processor circuitry is further to: establish a secured connection with the AP for a first time; and disconnect the secured connection with the AP.

Example 8 includes the apparatus of Example 1, wherein: the verification sequence has a length of 128 bits or more; or the VP has a length of 128 bits or more.

Example 9 includes the apparatus of Example 1, wherein the wireless communication device includes a wireless station (STA).

Example 10 includes an apparatus for a wireless communication device, the apparatus comprising: a Radio Frequency (RF) interface; and processor circuitry coupled with the RF interface, wherein the processor circuitry is to: decode a probe request received from a second wireless communication device via the RF interface to obtain a verification sequence; and encode, in response to the probe request, a probe response for transmission to the second wireless communication device via the RF interface, wherein the probe response includes a verification result which is based on the verification sequence and a verification password (VP).

Example 11 includes the apparatus of Example 10, the processor circuitry is further to: determine the verification result by performing an algorithm over the verification sequence with the VP.

Example 12 includes the apparatus of Example 11, wherein the algorithm includes a Hash algorithm.

Example 13 includes the apparatus of Example 10, the processor circuitry is further to: encode, prior to reception of the probe request, the VP in an encrypted data frame for transmission to the second wireless communication device via the RF interface.

Example 14 includes the apparatus of Example 10, wherein the verification sequence is a random sequence.

Example 15 includes the apparatus of Example 10, wherein prior to reception of the probe request, the processor circuitry is further to: establish a secured connection with the second wireless communication device for a first time; and disconnect the secured connection with the second wireless communication device.

Example 16 includes the apparatus of Example 10, wherein the wireless communication device includes an access point (AP).

Example 17 includes a computer-readable medium having instructions stored thereon, the instructions when executed by processor circuitry cause the processor circuitry to: encode a verification sequence in a probe request for transmission to an access point (AP); decode, in response to the probe request, a probe response received from the AP to obtain a first verification result; determine a second verification result based on the verification sequence and a verification password (VP) obtained from the AP; and determine whether a verification for the AP is successful or not based on the first verification result and the second verification result.

Example 18 includes the computer-readable medium of Example 17, wherein the instructions when executed by the processor circuitry further cause the processor circuitry to: determine the second verification result by performing an algorithm over the verification sequence with the VP.

Example 19 includes the computer-readable medium of Example 18, wherein the algorithm includes a Hash algorithm.

Example 20 includes the computer-readable medium of Example 17, wherein the instructions when executed by the processor circuitry further cause the processor circuitry to: compare the first verification result with the second verification result; and determine that the verification for the AP is successful if the first verification result matches with the second verification result.

Example 21 includes the computer-readable medium of Example 17, wherein the instructions when executed by the processor circuitry further cause the processor circuitry to: decode an encrypted data frame received from the AP to obtain the VP.

Example 22 includes the computer-readable medium of Example 17, wherein the instructions when executed by the processor circuitry further cause the processor circuitry to: randomly generate the verification sequence.

Example 23 includes the computer-readable medium of Example 17, wherein the instructions when executed by the processor circuitry further cause the processor circuitry to: before encoding the verification sequence in the probe request: establish a secured connection with the AP for a first time; and disconnect the secured connection with the AP.

Example 24 includes the computer-readable medium of Example 17, wherein: the verification sequence has a length of 128 bits or more; or the VP has a length of 128 bits or more.

Example 25 includes a computer-readable medium having instructions stored thereon, the instructions when executed by processor circuitry cause the processor circuitry to: decode a probe request received from a second wireless communication device via the RF interface to obtain a verification sequence; and encode, in response to the probe request, a probe response for transmission to the second wireless communication device via the RF interface, wherein the probe response includes a verification result which is based on the verification sequence and a verification password (VP).

Example 26 includes the computer-readable medium of Example 25, wherein the instructions when executed by the processor circuitry further cause the processor circuitry to: determine the verification result by performing an algorithm over the verification sequence with the VP.

Example 27 includes the computer-readable medium of Example 26, wherein the algorithm includes a Hash algorithm.

Example 28 includes the computer-readable medium of Example 25, wherein the instructions when executed by the processor circuitry further cause the processor circuitry to: encode, prior to reception of the probe request, the VP in an encrypted data frame for transmission to the second wireless communication device via the RF interface.

Example 29 includes the computer-readable medium of Example 25, wherein the verification sequence is a random sequence.

Example 30 includes the computer-readable medium of Example 25, wherein the instructions when executed by the processor circuitry further cause the processor circuitry to prior to reception of the probe request: establish a secured connection with the second wireless communication device for a first time; and disconnect the secured connection with the second wireless communication device.

Example 31 includes a method, comprising: encoding a verification sequence in a probe request for transmission to an access point (AP); decoding, in response to the probe request, a probe response received from the AP to obtain a first verification result; determining a second verification result based on the verification sequence and a verification password (VP) obtained from the AP; and determining whether a verification for the AP is successful or not based on the first verification result and the second verification result.

Example 32 includes the method of Example 31, further comprising: determining the second verification result by performing an algorithm over the verification sequence with the VP.

Example 33 includes the method of Example 32, wherein the algorithm includes a Hash algorithm.

Example 34 includes the method of Example 31, further comprising: comparing the first verification result with the second verification result; and determining that the verification for the AP is successful if the first verification result matches with the second verification result.

Example 35 includes the method of Example 31, further comprising: decoding an encrypted data frame received from the AP to obtain the VP.

Example 36 includes the method of Example 31, further comprising: randomly generating the verification sequence.

Example 37 includes the method of Example 31, further comprising before encoding the verification sequence in the probe request: establishing a secured connection with the AP for a first time; and disconnecting the secured connection with the AP.

Example 38 includes the method of Example 31, wherein: the verification sequence has a length of 128 bits or more; or the VP has a length of 128 bits or more.

Example 39 includes a method, comprising: decoding a probe request received from a second wireless communication device via the RF interface to obtain a verification sequence; and encoding, in response to the probe request, a probe response for transmission to the second wireless communication device via the RF interface, wherein the probe response includes a verification result which is based on the verification sequence and a verification password (VP).

Example 40 includes the method of Example 39, further comprising: determining the verification result by performing an algorithm over the verification sequence with the VP.

Example 41 includes the method of Example 40, wherein the algorithm includes a Hash algorithm.

Example 42 includes the method of Example 39, further comprising: encoding, prior to reception of the probe request, the VP in an encrypted data frame for transmission to the second wireless communication device via the RF interface.

Example 43 includes the method of Example 39, wherein the verification sequence is a random sequence.

Example 44 includes the method of Example 39, further comprising: prior to reception of the probe request: establishing a secured connection with the second wireless communication device for a first time; and disconnecting the secured connection with the second wireless communication device.

Example 45 includes an apparatus, comprising: means for encoding a verification sequence in a probe request for transmission to an access point (AP); means for decoding, in response to the probe request, a probe response received from the AP to obtain a first verification result; means for determining a second verification result based on the verification sequence and a verification password (VP) obtained from the AP; and means for determining whether a verification for the AP is successful or not based on the first verification result and the second verification result.

Example 46 includes the apparatus of Example 45, further comprising: means for determining the second verification result by performing an algorithm over the verification sequence with the VP.

Example 47 includes the apparatus of Example 46, wherein the algorithm includes a Hash algorithm.

Example 48 includes the apparatus of Example 45, further comprising: means for comparing the first verification result with the second verification result; and means for determining that the verification for the AP is successful if the first verification result matches with the second verification result.

Example 49 includes the apparatus of Example 45, further comprising: means for decoding an encrypted data frame received from the AP to obtain the VP.

Example 50 includes the apparatus of Example 45, further comprising: means for randomly generating the verification sequence.

Example 51 includes the apparatus of Example 45, further comprising means for performing following operations before encoding the verification sequence in the probe request: establishing a secured connection with the AP for a first time; and disconnecting the secured connection with the AP.

Example 52 includes the apparatus of Example 45, wherein: the verification sequence has a length of 128 bits or more; or the VP has a length of 128 bits or more.

Example 53 includes an apparatus, comprising: means for decoding a probe request received from a second wireless communication device via the RF interface to obtain a verification sequence; and means for encoding, in response to the probe request, a probe response for transmission to the second wireless communication device via the RF interface, wherein the probe response includes a verification result which is based on the verification sequence and a verification password (VP).

Example 54 includes the apparatus of Example 53, further comprising: means for determining the verification result by performing an algorithm over the verification sequence with the VP.

Example 55 includes the apparatus of Example 54, wherein the algorithm includes a Hash algorithm.

Example 56 includes the apparatus of Example 53, further comprising: means for encoding, prior to reception of the probe request, the VP in an encrypted data frame for transmission to the second wireless communication device via the RF interface.

Example 57 includes the apparatus of Example 53, wherein the verification sequence is a random sequence.

Example 58 includes the apparatus of Example 53, further comprising: means for performing following operations prior to reception of the probe request: establishing a secured connection with the second wireless communication device for a first time; and disconnecting the secured connection with the second wireless communication device.

Example 59 includes a station (STA) as shown and described in the description.

Example 60 includes a method performed at a station (STA) as shown and described in the description.

Example 61 includes an access point (AP) as shown and described in the description.

Example 62 includes a method performed at an access point (AP) as shown and described in the description.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. The phrases "in an embodiment" "in one embodiment" and "in some embodiments" are used repeatedly herein. The phrase generally does not refer to the same embodiment; however, it may.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. An apparatus for a wireless communication device, the apparatus comprising:
   a memory; and
   processor circuitry coupled with the memory,
   wherein the processor circuitry is to:
      establish a secured connection with an access point (AP) for a first time;
      obtain a verification password (VP) from the AP over the secured connection to store in the memory;
      disconnect the secured connection with the AP after obtaining the VP;
      randomly generate, after disconnecting the secured connection with the AP, a verification sequence;
      encode the verification sequence in a probe request for transmission to the AP;
      decode a probe response received from the AP in response to the probe request to obtain a first verification result;
      determine a second verification result based on the verification sequence and the VP;

determine whether a verification for the AP is successful or not based on the first verification result and the second verification result; and re-establish the secured connection with the AP for data transmission if it is determined that the verification for the AP is successful.

2. The apparatus of claim 1, wherein the processor circuitry is further to:
determine the second verification result by performing an algorithm over the verification sequence with the VP.

3. The apparatus of claim 2, wherein the algorithm includes a Hash algorithm.

4. The apparatus of claim 1, wherein the processor circuitry is further to:
compare the first verification result with the second verification result; and
determine that the verification for the AP is successful if the first verification result matches with the second verification result.

5. The apparatus of claim 1, wherein the processor circuitry is further to:
decode an encrypted data frame received from the AP to obtain the VP.

6. The apparatus of claim 1, wherein:
the verification sequence has a length of 128 bits or more; or
the VP has a length of 128 bits or more.

7. The apparatus of claim 1, wherein the wireless communication device includes a wireless station (STA).

8. An apparatus for a wireless communication device, the apparatus comprising:
a Radio Frequency (RF) interface; and
processor circuitry coupled with the RF interface,
wherein the processor circuitry is to:
establish a secured connection with a second wireless communication device for a first time;
encode a verification password (VP) for transmission to the second wireless communication device over the secured connection via the RF interface;
disconnect the secured connection with the second wireless communication device after transmission of the VP to the second wireless communication device;
decode, after disconnecting the secured connection with the second wireless communication device, a probe request received from the second wireless communication device via the RF interface to obtain a random verification sequence; and
encode, in response to the probe request, a probe response for transmission to the second wireless communication device via the RF interface, wherein the probe response includes a verification result which is based on the random verification sequence and the VP.

9. The apparatus of claim 8, the processor circuitry is further to:
determine the verification result by performing an algorithm over the verification sequence with the VP.

10. The apparatus of claim 9, wherein the algorithm includes a Hash algorithm.

11. The apparatus of claim 8, the processor circuitry is further to:
encode the VP in an encrypted data frame for transmission to the second wireless communication device via the RF interface.

12. The apparatus of claim 8, wherein the wireless communication device includes an access point (AP).

13. A non-transitory computer-readable medium having instructions stored thereon, the instructions when executed by processor circuitry cause the processor circuitry to:
establish a secured connection with an access point (AP) for a first time;
obtain a verification password (VP) from the AP over the secured connection to store in a memory;
disconnect the secured connection with the AP after obtaining the VP;
randomly generate, after disconnecting the secured connection with the AP, a verification sequence;
encode the verification sequence in a probe request for transmission to the AP;
decode a probe response received from the AP in response to the probe request to obtain a first verification result;
determine a second verification result based on the verification sequence and the VP;
determine whether a verification for the AP is successful or not based on the first verification result and the second verification result; and
re-establish the secured connection with the AP for data transmission if it is determined that the verification for the AP is successful.

14. The non-transitory computer-readable medium of claim 13, wherein the instructions when executed by the processor circuitry further cause the processor circuitry to:
determine the second verification result by performing an algorithm over the verification sequence with the VP.

15. The non-transitory computer-readable medium of claim 14, wherein the algorithm includes a Hash algorithm.

16. The non-transitory computer-readable medium of claim 13, wherein the instructions when executed by the processor circuitry further cause the processor circuitry to:
compare the first verification result with the second verification result; and
determine that the verification for the AP is successful if the first verification result matches with the second verification result.

17. The non-transitory computer-readable medium of claim 13, wherein the instructions when executed by the processor circuitry further cause the processor circuitry to:
decode an encrypted data frame received from the AP to obtain the VP.

18. The non-transitory computer-readable medium of claim 13, wherein:
the verification sequence has a length of 128 bits or more; or
the VP has a length of 128 bits or more.

* * * * *